Sept. 6, 1966 L. A. SCHLABACH 3,271,654
APPARATUS FOR REGULATING THE PHASE AND MAGNITUDE OF THE OUTPUT
VOLTAGE OF A POLYPHASE INVERTER
Filed Jan. 25, 1963 7 Sheets-Sheet 1

WITNESSES:
Bernard R. Gieguey
Leon J. Taja

INVENTOR
Leland A. Schlabach
BY John L. Stoughton
ATTORNEY

United States Patent Office 3,271,654
Patented Sept. 6, 1966

3,271,654
APPARATUS FOR REGULATING THE PHASE AND MAGNITUDE OF THE OUTPUT VOLTAGE OF A POLYPHASE INVERTER
Leland A. Schlabach, Wilkins Township, Allegheny County, Pa., assignor to Westinghouse Electric Corporation, Pittsburgh, Pa., a corporation of Pennsylvania
Filed Jan. 25, 1963, Ser. No. 253,814
15 Claims. (Cl. 321—5)

This invention relates generally to polyphase inverters and more particularly to a three-phase inverter in which the line-to-line output voltage actuates a voltage regulating means for changing the output voltage of at least one of the phase voltages and in which a change in a phase voltage is also effective to change at least one line-to-line voltage.

An important object of this invention is to provide an improved polyphase regulating device which will maintain the phase relationship at an exact angle. A further object is to provide such a device which is responsive solely to voltage magnitude.

A still further object of this invention is to provide a polyphase network in which each output voltage is made up of at least two voltage sources and in which each source has portions making up portions of two output voltages and the desired magnitude of each output voltage and the angles between the output voltages are maintained at equal magnitudes.

Other objects of of the invention will be apparent from the specification, the appended claims and the drawings in which:

Figure 1:
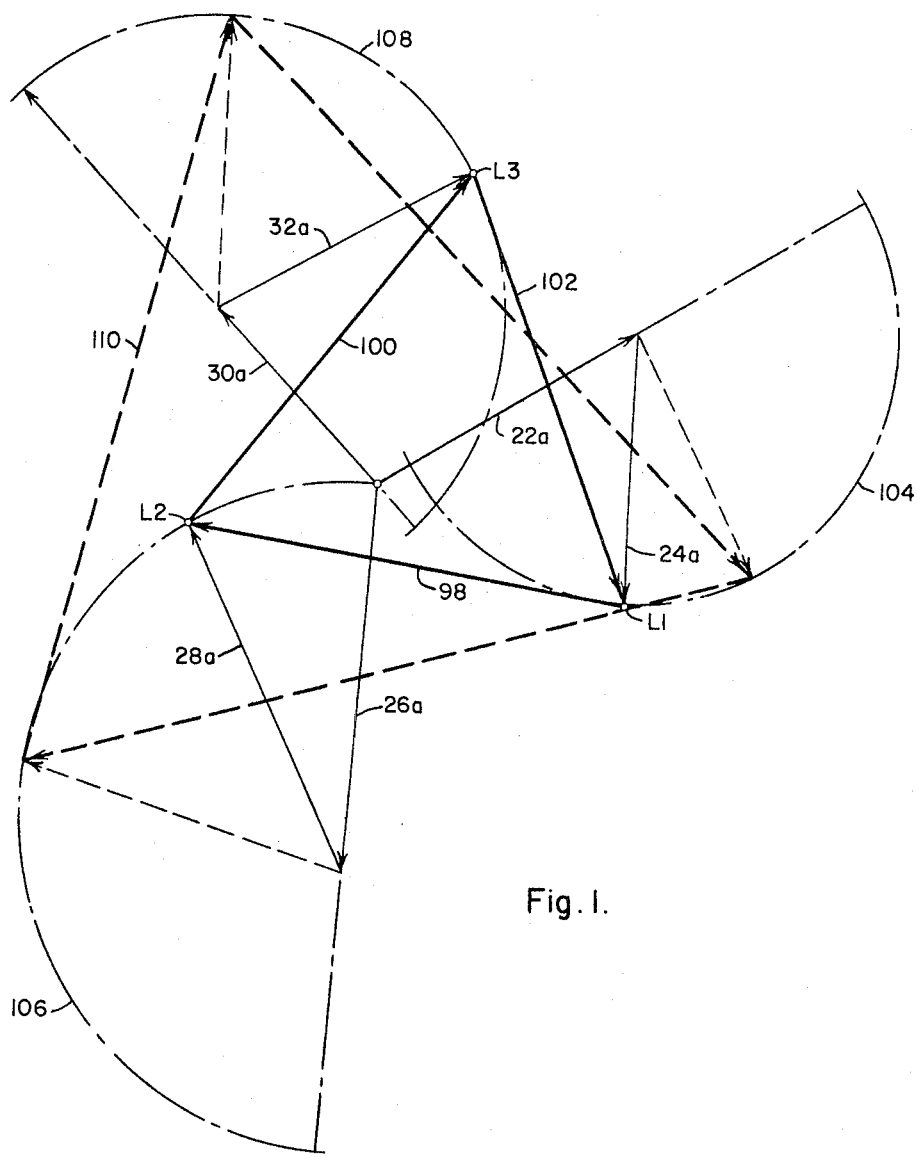
FIGURE 1 is a vector diagram illustrating the voltage relationships in one form of the invention.

Referring to the drawings (FIG. 5) by characters of reference the numeral 21 indicates generally a generating system for a three-phase alternating current supply comprising a plurality of inverters 22, 24, 26, 28, 30 and 32. Each inverter is provided with pairs of alternating current output terminals 5–6 and 13–14, a pair of input control terminals 3 and 4 and pairs of direct current power supplying terminals 1—1 and 2—2. The inverters 22, 26 and 30 have their input terminals 3 and 4 connected respectively to the output terminals 35–36, 39–40 and 37–38 of an oscillator network 34.

The output terminals 9 and 10 of the inverter 22 are connected respectively to the terminals 7 and 4 of the inverter 30 while the terminals 9 and 10 of the inverter 26 are connected respectively to the terminals 7 and 4 of the inverter 22. Similarly the terminals 9 and 10 of the inverter 30 are connected respectively to the terminals 7 and 4 of the inverter 26. As will be made clear below, this interconnection interlocks the three inverters and assures that for each oscillation of the oscillator 34 only one of the inverters 22, 26 or 30 will be actuated to provide a sequence in which the alternating potential generated by the inverters 22, 26 and 30 will be relatively phased at an angle which approximates 120 electrical degrees.

Figure 5:
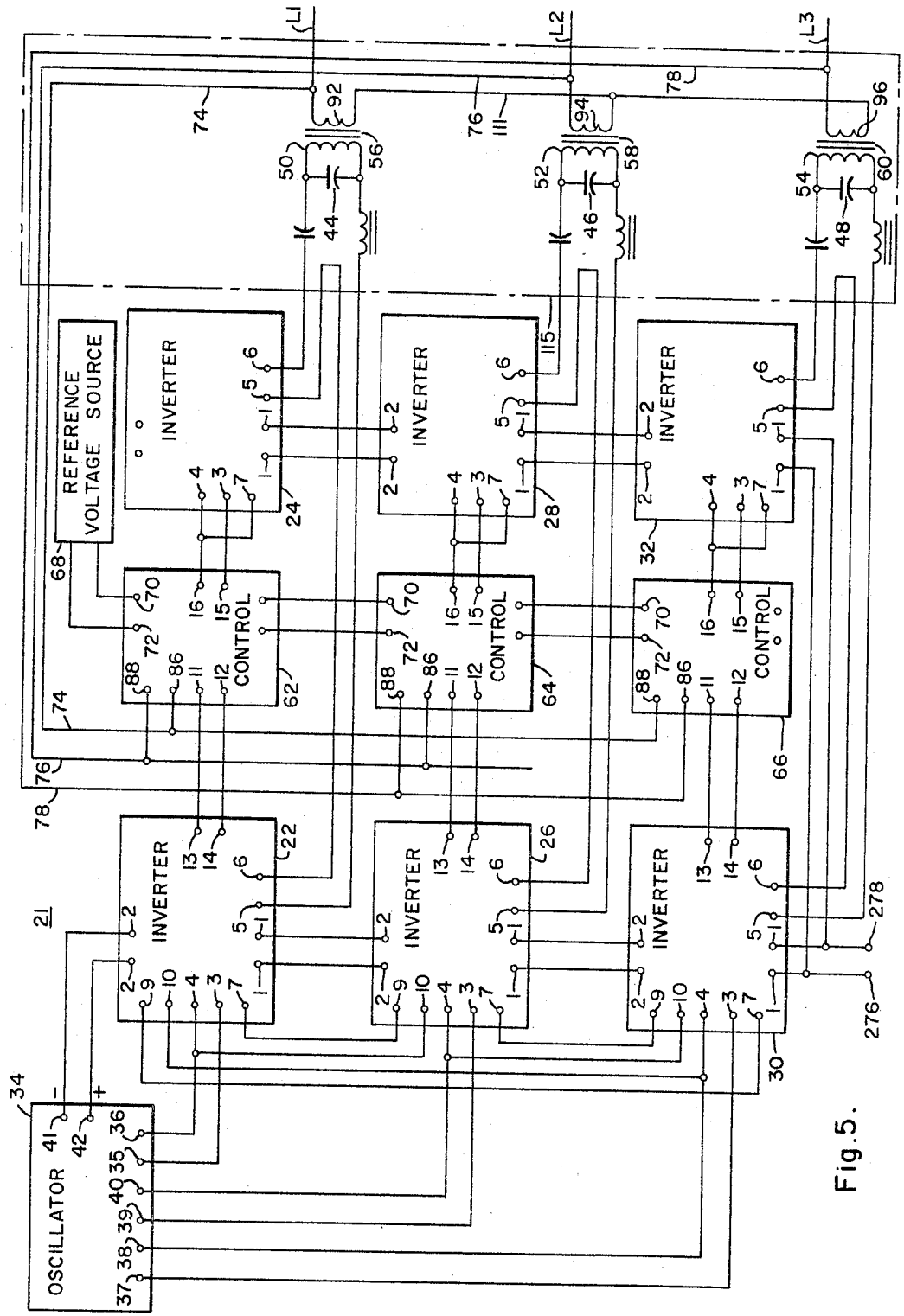
FIG. 5 is a diagram partially in block form and partially in schematic form, illustrating one arrangement for generating voltages in accordance with the vector diagram of FIG. 1.

As illustrated in FIG. 5, the output windings 5 and 6 of the sets of inverters 22–24, 26–28 and 30–32 are individually connected in series with each other through resonating networks 44, 46, and 48 to the primary windings 50, 52 and 54 of transformers 56, 58 and 60 respectively. The net voltage applied to each of the transformers 56, 58 and 60 may be controlled by varying the phase angle between the output voltages of the separate inverters forming the sets of inverters 22–24, 26–28 and 30–32. The relative phase angle of the separate inverters of the sets of inverters 22–24, 26–28 and 30–32 is controlled respectively by controls 62, 64 and 66.

A phasing voltage for synchronizing the output frequency of the inverters 24, 28 and 30 with that of the inverters 22, 26 and 30 is supplied to the input terminals 11 and 12 of the controls 62, 64 and 66 from the output terminals 13 and 14 of the inverters 22, 26 and 30 respectively, and supplied through current output terminals 15 and 16 connected to the control terminals 4 and 3 of the inverters 24, 28 and 32 respectively. The phase angle between the alternating current input voltage to the input terminals 11 and 12 and the alternating current output voltage at the output terminals 15 and 16 is determined by comparing a line voltage with a source of reference voltage. This reference potential is supplied to the input terminals 70 and 72 from the reference voltage source 68. The proper line voltage for the particular one of the contorls 62, 64 and 66 is supplied from the lines L1, L2 and L3 by means of the conductors 74, 76 and 78. The control 62 has its terminals 86 and 88 connected between the conductors 74 and 76 whereby it is sensitive to the voltage between the lines L1 and L2. The control 64 has its terminals 86 and 88 connected between the conductors 76 and 78 whereby it is sensitive to the voltage between the lines L2 and L3 and the control 66 has its terminals 86 and 88 connected between the conductors 78 and 74 whereby it is sensitive to the voltage between the lines L1 and L3. Each of the controls 62, 64 and 66 is identical and includes a transformer 90 having its primary connected to its input terminals 86 and 88.

The secondary windings 92, 94 and 96 of the output transformers 56, 58 and 60 are connected in Y connection and supply the lines L1, L2 and L3 with three-phase sinusoidal electrical energy. The vector relationship of the voltages supplied by the inverters 22–24, 26–28, and 30–32 are illustrated in FIG. 1. The voltages generated by the inverters 22 and 24 are designated respectively 22a and 24a, the voltages of the inverters 26 and 28 by the characters 26a and 28a and the voltages of the inverters 30 and 32 of the characters 30a and 32a. The voltages appearing between the lines L1 and L2, L2 and L3, and L3 and L1 are illustrated by the vectors 98, 100 and 102 respectively. The dot dash semicircles 104, 106 and 108 represent the loci of the voltage vectors 24a, 28a and 30a respectively as their phase is changed with respect to the vectors 22a, 26a and 30a assuming that the relative angles between the vectors 22a, 26a and 30a remain fixed as well as the magnitudes of the vectors 22a, 24a, 26a, 28a, 30a and 32a. The dotted line triangle 110 represents the vector of the output voltages when the line voltage has been increased above that indicated by the vectors 98, 100 and 102. In reality, differences in the internal impedances of the various inverters as well as differences in the individual components such as the included controlled rectifiers will cause the magnitude of the voltages to change as the current drawn by the load supplied by the network 1 varies. However, for simplicity, the magnitudes of the vectors have ben illustrated as being constant and the phase angles have been shown as being approximately the same. As suggested above, the normal conditions will result in some differences in the lengths of the various vectors and some differences in the various phase angles. These differences will in no way interfere with the functioning of the apparatus.

Figure 2:
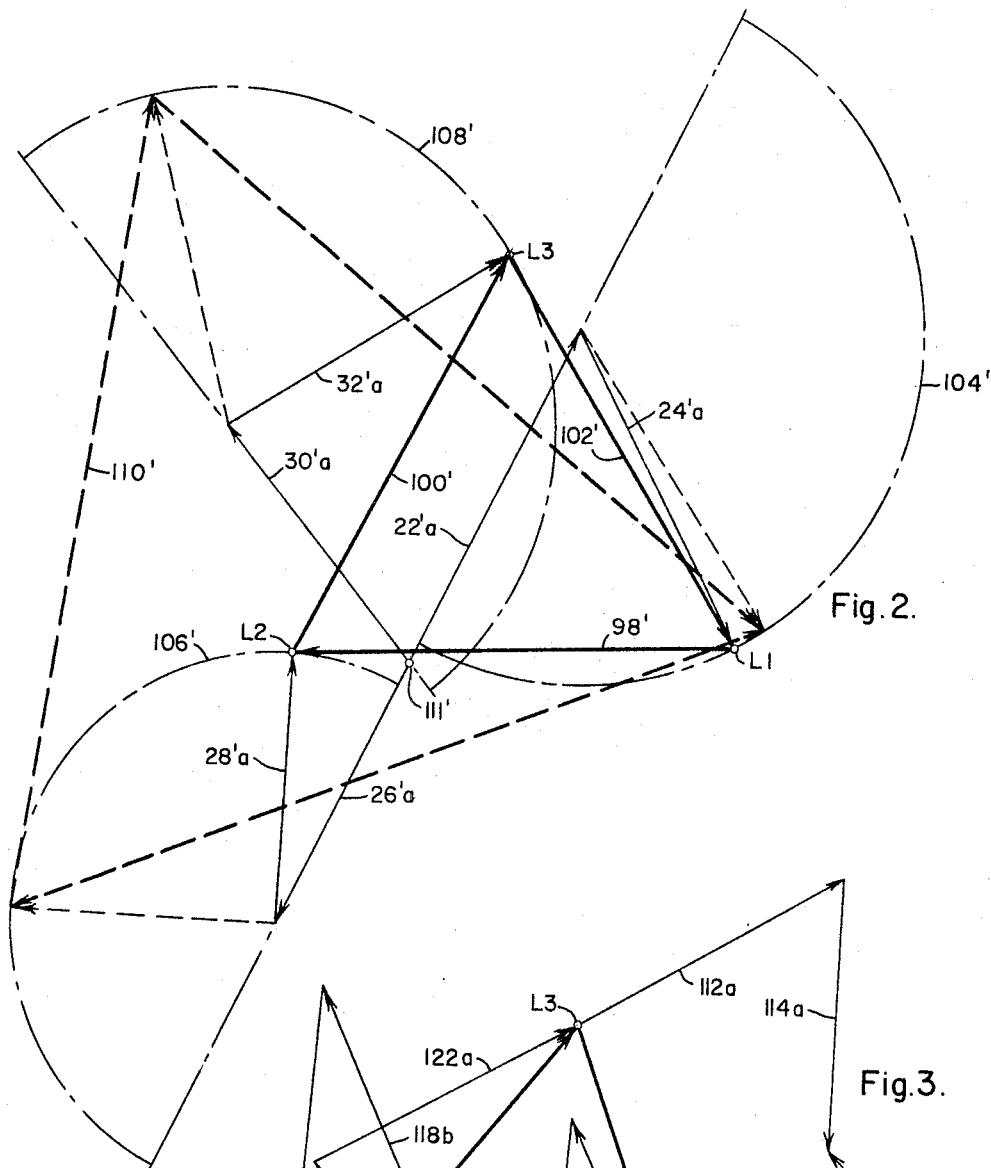
FIG. 2 is a vector diagram illustrating a modified voltage relationship embodying the invention.

As illustrated in FIG. 2, wherein the corresponding vector quantities are identified by the same reference characters with the addition of a "prime," in the generic sense, the relative phasing of the output voltages of the inverters may vary widely. Because of the complexities in the drawing of the loci 104, 106 and 108 or 104′, 106′ and 108′ with changing magnitudes of their component vectors, the form in which the lengths of the vectors vary has not been illustrated however, it will be apparent that the apparatus will operate in substantially the same manner.

Figure 3:
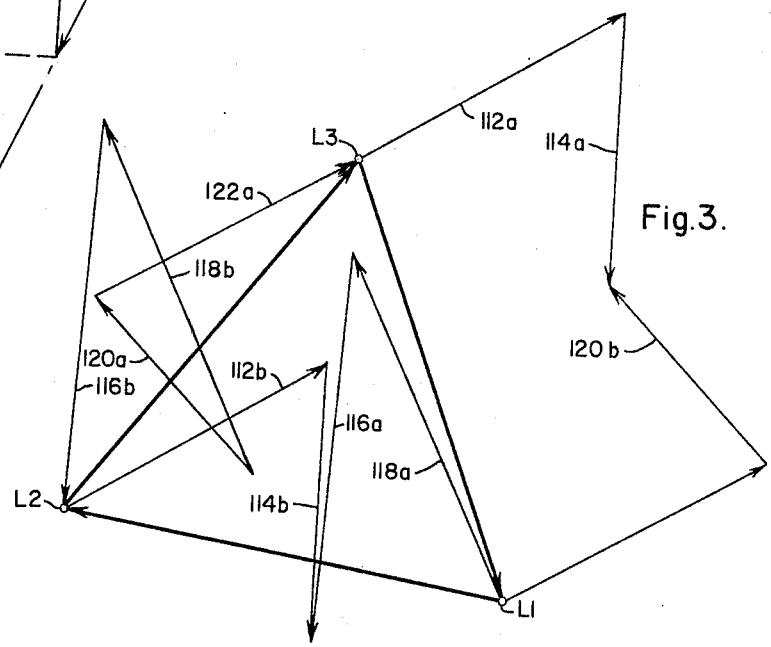
FIG. 3 is a vector diagram illustrating a further modified voltage relationship embodying the invention.

The connection as illustrated in FIGS. 1, 2 and 5 is Y and includes a common or neutral connection 111. In the more generic form of the invention, this connection may be omitted and the output voltages connected into a "mesh" or "delta" network as illustrated vectorially in FIG. 3 and schematically in FIGS. 5 and 6 when the output circuit 113 of FIG. 6 is substituted for the output circuit 115 of FIG. 5.

It will be appreciated from an examination of the vector diagram of FIG. 1, that the vector 98 is the sum of the vectors 22a, 24a, 26a and 28a, the vector 100 is the sum of the vectors 26a, 28a, 30a and 32a and the vector 102 is the sum of the vectors 30a, 32a, 22a and 24a. The magnitudes of the vector 98 is held at the desired value by an appropriate change in the angle between the vectors 22a and 24a. The vectors 22a and 24a also determine, along with vectors 30a and 32a, the vector 102. Therefore, when a change in the magnitude of the vector 98 necessitates a change in the phase angle between vectors 22a and 24a the magnitude of vector 102 will change. When the magnitude of 102 changes the control which is sensitive to the vector 102, it will operate to change the phase angle between the vectors 30a and 32a to return the vector 102 to its proper magnitude. The vectors 30a and 32a when combined with vectors 26a and 28a determine the vector 100. Therefore, as before the change in this phase angle between vectors 30a and 32a will change the magnitude of vector 100 which is done by changing the relative angle of the vectors 26a and 28a. It may be proven mathematically and can be shown geometrically by placing an equilateral triangle having sides equal to the magnitude of the line voltages that there is but one value of the vectors which is stable. These are the illustrated positions for the two voltage magnitudes. In accordance with geometric laws, if the magnitudes of three sides of a triangle are equal the angles are equal, therefore, if the magnitudes of the line voltages L1–L2, L2–L3 and L3–L1 are maintained equal, they will be relatively displaced by 120 electrical degrees.

It will be appreciated that the vectors 98, 100 and 102 are each the vector sum of four vectors. In the vector diagram of FIG. 1, the same two vectors physically appeared in two different line voltages. Electrically this is accomplished by the Y connections as identified by the numeral 115 in FIG. 5.

Figure 6:
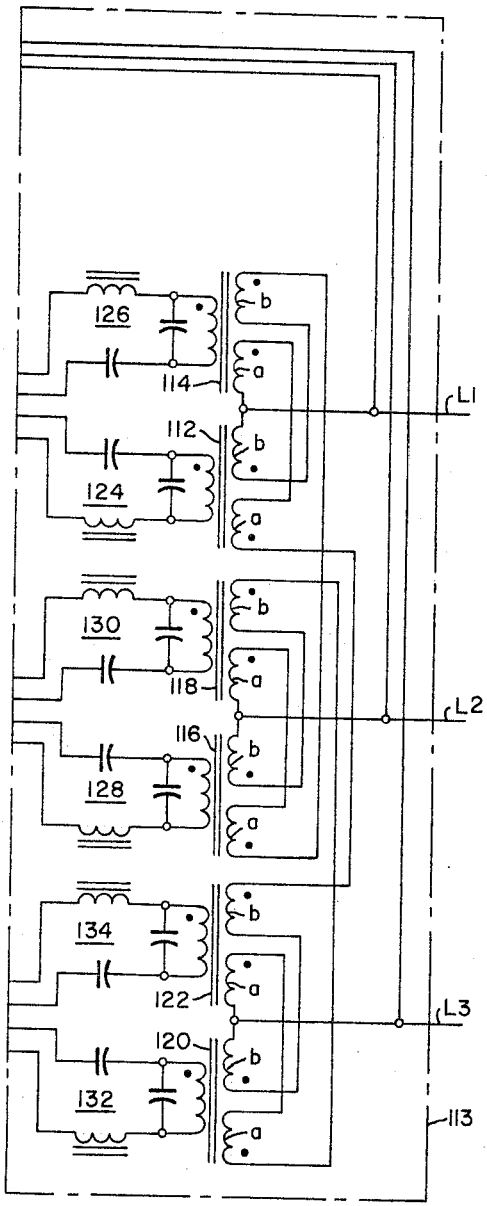
FIG. 6 is a circuit diagram which when substituted for the output circuit of FIG. 5 will provide voltages as illustrated in FIG. 3.

In the connections as illustrated in FIG. 6, the output voltages of the terminals 5 and 6 of the inverters 22, 24, 26, 28, 30 and 32 are individually connected to the primary windings of the transformers 112, 114, 116, 118, 120 and 122 respectively through networks 124, 126, 128, 130, 132 and 134 respectively. These transformers are each provided with two secondary windings identified by the letters a and b on the drawing and polarized with respect to each other and to the primary winding as illustrated by the conventional dot. The voltage generated in the secondary windings a and b of these transformers are conveniently referred to as 112a, 112b, 114a, 114b, etc. By connecting these windings according to the vector diagram in FIG. 1 but using a first secondary winding a to provide the vector between one pair of output lines and a second secondary winding b to provide the equivalent vector between another pair of output lines, the vector diagram of FIG. 3 results. Electrically this is accomplished by connecting the secondary windings of the transformers 112, 114, 116, 118, 120 and 122 as illustrated in FIG. 6. For space purposes, the order of the vectors in FIG. 3 has been altered but the result is obviously the same.

It will now be apparent from the foregoing description that generically the invention may be applied to both the Y and the mesh connections and that each line-to-line voltage is made up of the output voltage of two sets of inverters with the line-to-line voltage being held at a desired magnitude by the variation of the magnitude of the output voltage of only one of the inverter sets. The output voltage from the controlled set of inverters in a first line-to-line quantity also appears as a voltage quantity in a second line-to-line quantity and the controlled set of the second line-to-line quantity in the third, etc. whereby a change in the voltage output of the controlled set of inverters of any one line-to-line supply will cause an upset in all of the controlled sets. Since there is only one stable point at which all line-to-line voltages will be equal and this occurs only when the angle between any two voltages is 120 electrical degrees, the output voltages will maintain their desired phase merely by a simple magnitude control which maintains all of the line-to-line voltages at the same value.

The output voltages of the inverters 22, 24, 26, 28, 30 and 32 are supplied to transformers 112, 114, 116, 118, 120 and 122 through filter networks 124, 126, 128, 130, 132 and 134 respectively as shown in FIGS. 5–6 whereby output of the networks is substantially sinusoidal in form.

Figure 4:
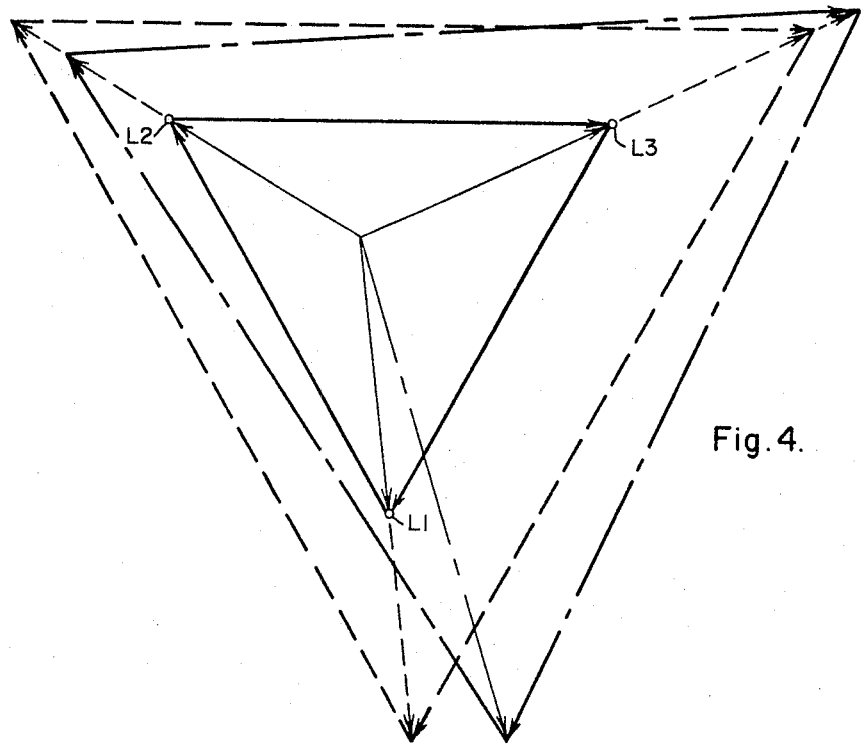
FIG. 4 is a vector diagram illustrating another modified voltage relationship embodying the invention.

In FIG. 4, the voltage vectors making up two of the triangles remain at substantially the same relative angles and the voltage regulation is obtained by varying the output voltage directly. If the phase angles of the voltage vectors do change, the output voltages may be maintained at equal magnitudes and equal phase angles as shown by the two larger triangles.

Figure 11:
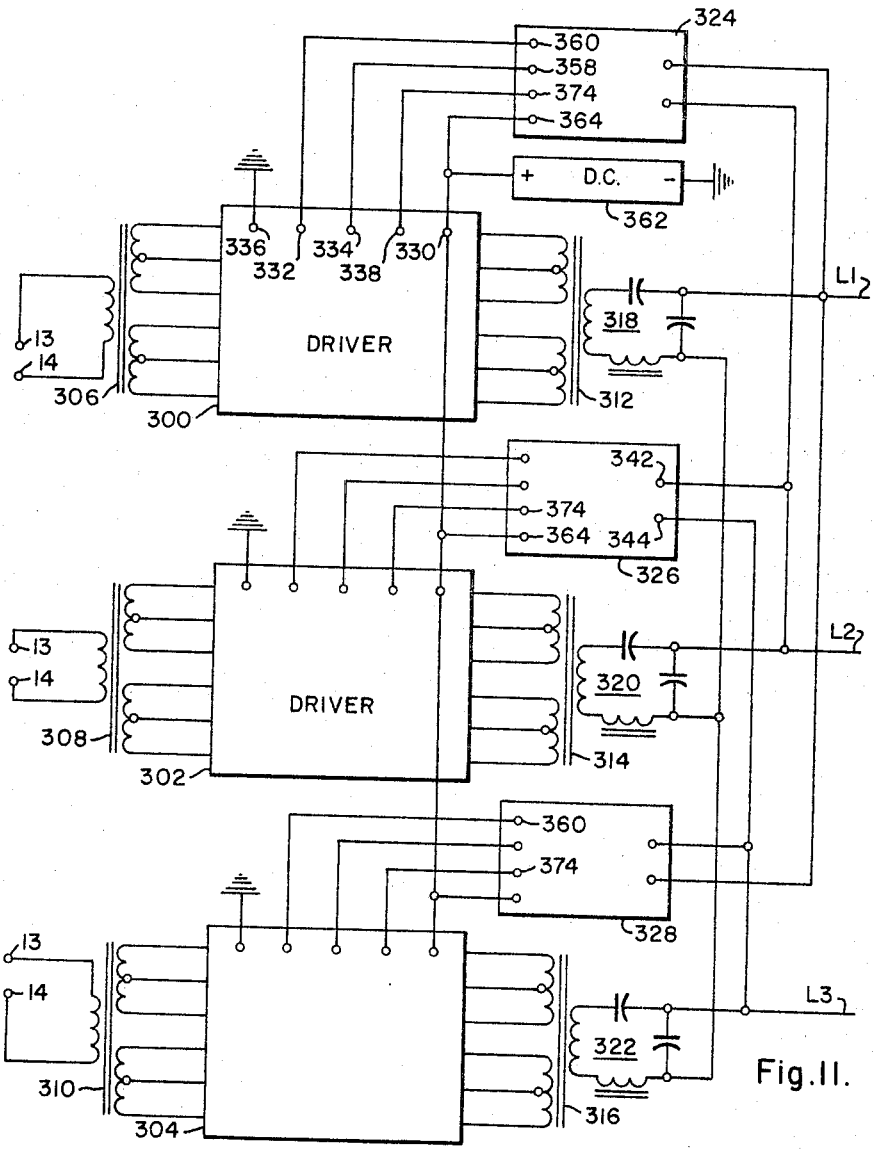
FIG. 11 is a diagram partially in block form and partially in schematic form, illustrating a circuit arrangement which, when used in conjunction with FIG. 5, will provide voltages as illustrated in FIG. 4.

FIG. 11 illustrates in block form an arrangement for generating the voltages as illustrated in FIG. 4. As illustrated in FIG. 11, the magnitudes are altered by regulating the proportion of the half cycle that power is supplied to the output terminals commonly referred to as pulse width modulation. The pulse width modulated inverters or drivers 300, 302 and 304 are energized through control transformers 306, 308 and 310 respectively. The primary windings of these transformers are energized respectively from the output terminals 13 and 14 of the inverters 22, and 26 and 30 of FIG. 5, the output voltage of the drivers 300, 302 and 304 is fed into power transformers 312, 314 and 316 which have their secondary windings connected in Y to the output conductors L1, L2, and L3. Networks 318, 320 and 322 are individually connected to the transformers 312, 314 and 316, respectively, so that substantially sine wave voltage is supplied to the lines L1, L2 and L3.

The line voltages L1–L2, L2–L3, and L3–L1 are sensed by the pulse width regulating devices 324, 326 and 328 respectively. These devices 324, 326 and 328 control the interval between the time that the voltage applied to transformers 306, and 308 and 310 changes polarity and the time that the drivers 300, 302 and 304 are actuated to energize the output transformers 312, 314 and 316.

Figure 7:
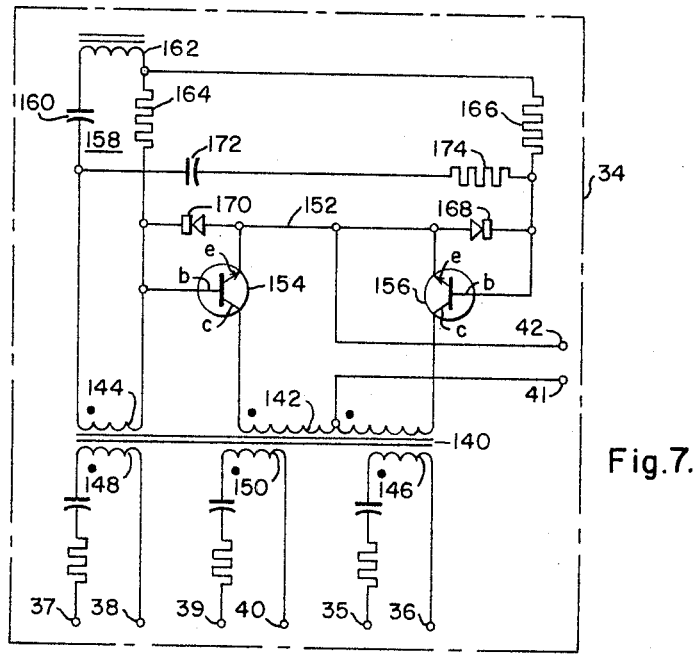
FIG. 7 is a schematic diagram of an oscillator which may be used in FIG. 5.

FIG. 7 illustrates one form of an oscillator which may be used at 34. The oscillator 34 includes a transformer 140 having a center tapped primary winding 142 and four secondary windings 144, 146, 148 and 150. The output windings 146, 148 and 150 are respectively connected to the pairs of output terminals 35–36, 37–38 and 39–40 respectively. Each of these connections includes a capacitor and a current limiting resistor proportioned to provide a steep wave front of current for quickly switching the transistors of the inverters 22, 26 and 30 at certain designated times as will be explained below. Direct current power for the oscillator is supplied to its input terminals 41 and 42 from the output terminals 2—2 of the inverter 22. Internally the terminal 41 is connected to the center tap of the primary winding 142 and the terminal 42 is connected to a common emitter bus 152 which is directly connected to the emitters $e$ of a pair of transistor semiconductor devices 154 and 156, the collectors $c$ of which are individually connected to the end terminals of the primary winding 142. Feedback voltage for causing the oscillator 34 to oscillate is supplied to the base emitter circuits of the transistors 154 and 156 from the secondary winding 144 to which a resonant network 158 is connected. The network 158 comprises in series connection a capacitor 160 and inductance 162 and a resistor 164. The relative magnitudes of the capacitor 160, inductance 162 and resistor 164 are so chosen that the network 158 will resonate at the desired output frequency of the oscillator which, as illustrated, is exactly three times the output frequency of the three-phase line to be supplied by the network 1.

One terminal of the resistor 164 is directly connected to the base $b$ of the transistor 154. The other terminal of resistor 164 is connected to the base $b$ of the transistor 156 through a current limiting resistor 166. Diodes 168 and 170 are individually connected between the base $b$ and emitter $e$ of the devices 156 and 154 respectively in a polarity to conduct current in a direction from the emitter to base. With this arrangement, the resistor 166 limits the base current flowing in both transistors 154 and 156.

During one-half cycle of the voltage appearing across the resistor 164, as for example that half cycle in which the terminal thereof connected to the base $b$ of the transistor 154 is positive, current will flow through the base emitter circuit of the transistor 154, the emitter bus 152 and diode 168 through the current limiting resistor 166 to the other terminal of the voltage supplying resistor 164 to render transistor 154 conducting. During the opposite half cycle of the voltage appearing across the resistor 164 current will flow through the resistor 166, the base emitter circuit of the transistor 156 through diode 170 to the voltage supplying resistor 164 to render transistor 156 conducting. The diodes 168 and 170 provide a shunt path around and limit the reverse voltage applied to the emitter base circuits of the transistors 156 and 154 respectively.

In order to provide a steeper wave front for controlling the switching periods of the transistors 154 and 156 than would occur from the sinusoidal voltage wave appearing across the resistor 164, one terminal of the transformer 144 is connected through a capacitor 172 and a resistor 174 to the base $b$ of the transistor 156. The other terminal of the transformer 144 is directly connected to the base $b$ of the transistor 154. The time constant of the capacitor 172 and resistor 174 together with the base-emitter resistance of one of the transistors 156 and 154 and one of the diodes 168 and 170 is a small fraction of the cycle period of the resonating network 158. This superimposes a steep wave front of control current on the current supplied by the sine wave voltage to speed up the switching of the transistors 154 and 156. Since the superimposed current is of short duration, the normal drive current applied to these transistors will be obtained from the voltage appearing across the resistor 164.

Upon energization of the input terminals 41 and 42, one or the other of the transistors 154 and 156 will conduct more than the remaining one of the transistors thereby causing flux to build up in the core of the transformer 140 in a predetermined direction. Assuming that the transistor 154 conducts more than the transistor 156, current will flow theerthrough and through the left-hand half of the winding 142 inducing a voltage in the winding 144 of a polarity in which the terminal thereof, which is directly connected to the base $b$ of the transistor 154, is positive with respect to its other terminal. Current will flow from this terminal through the base $b$ and emitter $e$ of the transistor 154, the emitter bus 152, diode 168, resistor 174 and capacitor 172 to the other terminal of the winding 144. This current will turn on the transistor 154 causing more current to flow through the winding 142 thereby increasing the voltage output of the winding 144 to provide a regenerative action to quickly render the transistor 154 fully conductive. At the same time voltage is supplied from the winding 144 to the resonant network 158 which thereupon charges its capacitor 160. This flow of charging current maintains the transistor 154 conducting after the steep wave initiating current through the capacitor 172 ceases.

When the capacitor 160 is fully charged, the drive current to the transistor terminates and it returns to its nonconducting state. This permits the flux in the core of the transformer 140 to decrease from its saturated value to its remanence value. This decrease in flux in the core of the transformer 140 induces a voltage in the winding 144 in the opposite direction whereby charging current, in the opposite direction, is applied to the capacitor 172. Simultaneously, capacitors 160 and 172 begin discharging and the resulting current flows through the base-emitter circuit of the transistor 156 to turn this transistor on quickly, substantially as described above, causing the drive 156 to become fully conductive for current flow through the right-hand half of the primary winding 142 with the consequent buildup of flux in the core of the transformer 140 in the opposite direction for the second or negative half cycle output of the oscillator 34. The transistors 154 and 156 continue to alternate their conduction and energization of the winding 142 to provide alternating voltages at its output terminals 35–36, 37–38 and 39–40. Assuming a desired output frequency at the lines L1, L2 and L3 of 400 cycles, the oscillator would be adjusted to oscillate at a frequency of 1200 cycles per second.

Figure 8:
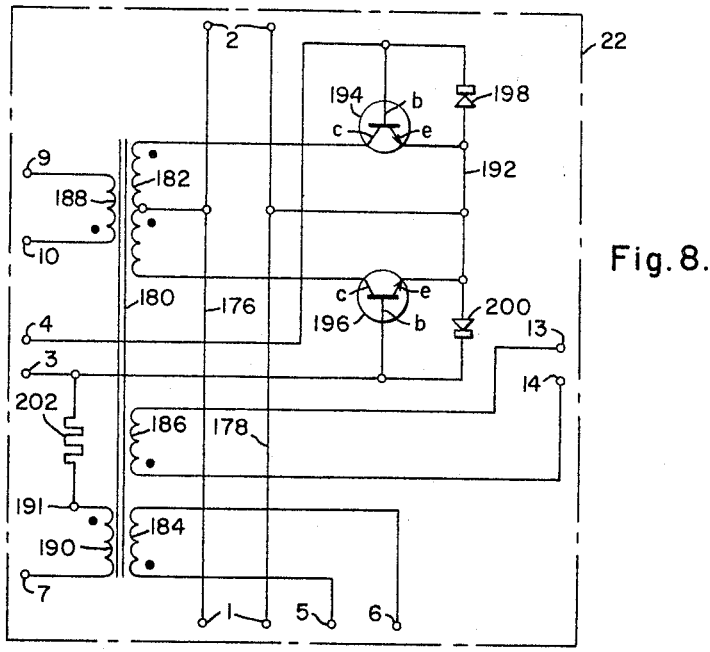
FIG. 8 is a schematic diagram of an inverter which may be used in FIG. 5.

The inverters 22, 24, 26, 28, 30 and 32 are preferably identical and may take any of various forms. A typical circuit is shown in FIG. 8. Since all of the inverters are identical, only one thereof will be described in detail. The circuit is supplied with direct current energy from a suitable source which is connected to a first pair of supply terminals 1. These terminals 1 are connected by busses 176 and 178 to a second pair of supply terminals 2. The bus 176 is connected to the center tap of the primary winding 182 of an output transformer 180. The emitters $e$ of a pair of power controlling transistors 194 and 196 are connected to a common emitter bus 192 which is connected to the power supplying bus 178. The collectors $c$ of these transistors are connected individually to the end terminals of the winding 182.

The transistors are arranged to conduct alternately for producing a reversing flux in the core of the transformer 180 and an alternating potential in its secondary windings. For the purpose of controlling the transistors 194 and 196, the transistor 194 has its base $b$ directly connected to the control terminal 4 and its emitter $e$ connected through a diode 200 to the control terminal 3. Similarly the transistor 196 has its base $b$ connected to the control terminal 3 and its emitter $e$ connected through a diode 198 to the control terminal 4. It will be appreciated that this arrangement places the diodes 198 and 200 in shunt across the emitter-base circuits of the transistors 194 and 196 in a polarity to shunt reverse current around these emitters and bases. When a control potential of predetermined magnitude and polarity is applied between terminals 3 and 4, base current will flow between the base *b* and emitter *e* of one of the transistors 196 and 194 and through one of the diodes 198 or 200 depending upon whether the terminal 3 is positive with respect to terminal 4 or vice versa to render one or the other of the transistors conductive.

Assuming that terminal 3 is positive with respect to terminal 4 current will flow from terminal 3, through the base in an emitter *e* of transistor 196, conductor 192 and diode 198 to terminal 4 and transistor 196 will conduct. When terminal 4 is positive with respect to terminal 3, current flows from terminal 4 through the base *b* and emitter *e* of transistor 194, conductor 192 and diode 200 to terminal 3 whereby transistor 194 will conduct. The potential provided by the oscillator 34 has a sharply rising wave shape so that the transistors 194 and 196 are switched rapidly into their conducting states.

The transformer 180 is provided with secondary windings 184, 186, 188 and 190. The power output secondary winding 184 is connected between the output terminals 5 and 6. The control output secondary winding 186 is connected to the output terminals 13 and 14 and provides a control signal for operating the phase shifter control. The secondary winding 188 is connected to output terminals 9 and 10 and supplies a voltage to interlock the operation of the inverters 22, 26, and 30, as will be described below. Winding 190 has one terminal connected to an output connection 7 and its other terminal 191 connected through a resistor 202 to the terminal 3. The output voltage of winding 190 may conveniently be the same as that of the oscillator windings while the output voltage of the winding 188 should be less by one-half.

Figure 9:
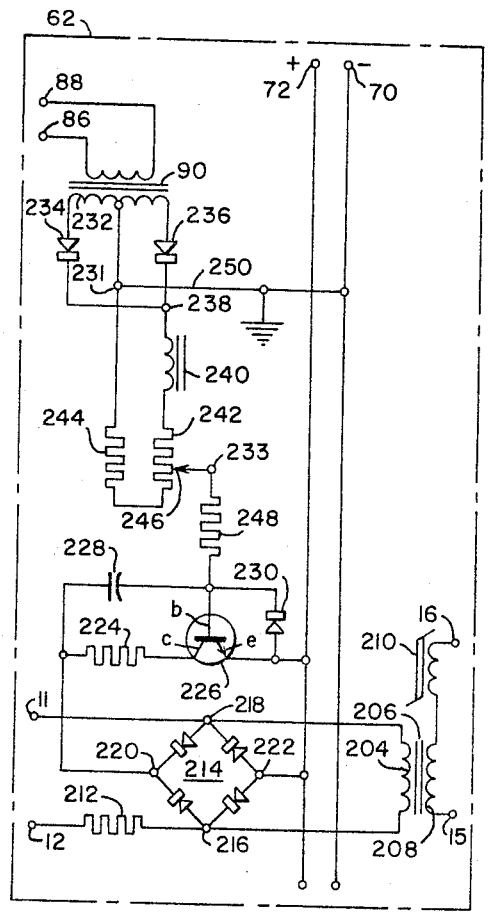
FIG. 9 is a schematic diagram of a control network which may be used in FIG. 5.

A typical circuit for the controls 62, 64 and 66 is shown in FIG. 9. Since the circuit for each of these controls 62, 64 and 66 is identical, only that for the control 62 will be described. It will further be understood that the controls 64 and 66 will cooperate with the inverters 26–28 and 30–32, respectively, in the same manner that the control 62 cooperates with the inverters 22 and 24. The control network 62 comprises a pair of input terminals 11 and 12 energized from the output terminals 13 and 14 of the inverter 22 and a pair of output terminals 15 and 16 which energize the input terminals 3 and 4 of the inverted 24 The input terminals 11 and 12 are connected internally to the end terminals of the primary winding 204 of a control transformer 206 which has its secondary winding 208 connected to the terminals 15 and 16 through a saturating core inductance 210. By controlling the input potential supplied to the winding 204 and thereby the voltage of the winding 208, the time of saturation of the inductance 210 may be controlled to provide the desired time interval between the application of potential to the terminals 11 and 12 and the energization of the terminals 15 and 16. Preferably the core of the inductance 210 is of a material having a rectangularly shaped hysteresis loop to provide sharp control and low energy loss.

Prior to saturation of the inductance 210, substantially all of the output voltage of the winding 208 appears across the inductance 210 and the output potential is too low to actuate the associated inverter 24. When the inductance 210 saturates, its impedance substantially disappears and the output voltage of the winding 208 appears across the terminals 15 and 16 whereby the voltage is sufficient to cause the valve devices 194 and 196 to reverse their conducting states.

The time delay required to saturate the inductance 210 may be regulated by controlling the voltage drop across a current limiting resistor 212 connected between the input terminal 12 and the transformer winding 204. This is accomplished by controlling current flow through a variable impedance network 214 shunt connected with the winding 204.

The network 214 comprises a pair of alternating current input terminals 216 and 218 connected to the end terminals of the winding 204 and a pair of direct current terminals 220 and 222. The terminals 220 and 222 are connected together by a regulatable impedance comprising in series a resistor 224 and the emitter collector circuit of a transistor 226. The magnitude of the impedance connected between the terminals 220 and 222 is controlled by the magnitude of the drive current applied to the base emitter circuit of the transistor 226. By varying the drive current and consequently the effective impedance between the terminals 220 and 222, the magnitude of the current shunted around the transformer 206 may be controlled. As the shunt current increases and decreases, a greater or lesser drop appears across the resistor 212 and a lesser or greater voltage is induced in the winding 208. This results in an increase or lesser time relay in the application of the control voltage to the associated inverter 24. A capacitor 228 is connected between the base *b* of the transistor 226 and the end of the resistor 224 remote from the collector *c* to add stability. A diode 230 is shunt connected across the base *b* and emitter *e* of the transistor 226 to limit reverse bias potential which may be applied thereto.

The drive current of the transistor 226 (of control 62) is controlled by means of an error voltage signal derived by comparing a reference potential applied to the control input termnials 70 and 72 with a line voltage derived from lines L1–L2. A similar drive current in the case of the controls is derived by comparing the reference potential with voltages derived from the lines L2–L3 and L3–L1, respectively. For this purpose the line voltage is applied to the terminals 86 and 88 to which the primary winding of the transformer 90 is connected. The transformer 90 is provided with a center tapped secondary winding 232 which is connected through a full wave rectifying network to a pair of terminals 231 and 233. The voltage derived from the lines L1 and L2 is connected in opposition with the regulated voltage supplied to the terminals 70 and 72. The resulting voltage is connected between the base *b* and emitter *e* of the transistor 226 and in a polarity such that an increase in the voltage derived from the terminals 86 and 88 causes an increased drive current to the transistor.

Specifically the end terminals of the winding 232 are connected through diodes 234 and 236 to one terminal 238 of a smoothing inductance 240 the other terminal of which is connected through a first resistor 242 and a second resistor 244 to the center tap 231 of the secondary winding which is the negative output terminal. The resistor 242 is provided with a tap 246 which preferably is adjustable along the resistor 242 and which is connected to the positive output terminal 233. The terminal 233 is connected through a resistor 248 to the base *b* of the transistor 226. The emitter *e* of the transistor 226 is directly connected to the input terminal 72 which is maintained positive with respect to the terminal 70 by the reference voltage source 68. The negative terminal 70 is connected by a conductor 250 to the negative output terminal 231 which may be grounded as illustrated if desired.

The oscillator output terminals 35–36, 39–40, and 37–38 are connected to the control input terminals 3 and 4 of the inverters 22, 26 and 30 respectively. In order to provide for the actuation of solely one of the inverters 22, 26 and 30 for each oscillation of the oscillator 34, the output terminals 9 and 10 of the inverter 22 are connected to the terminals 7 and 4 of the inverter 30. Similarly the output terminals 9 and 10 of the inverters 26 and 30 are connected to the terminals 7 and 4 of the inverters 22 and 26 respectively. If reversed phase rotation is desired the connections from the terminals 9 and 10 of inverter 22 may be connected to the inverter 26, those from the inverter 26 to inverter 30 and those from the inverter 30 to the inverter 22.

Direct potential electrical energy is supplied to the inverters 22, 24, 26, 28, 30 and 32 and the oscillator 34 by suitably energizing the input terminals 276 and 278 which are connected by conductors directly to the input terminals 1—1 of the inverters 30 and 32. The terminals 1—1 of the inverters 26 and 28 are connected to terminals 2—2 of the inverters 30 and 32. Similarly the input terminals 1—1 of the inverters 22 and 24 are connected to the terminals 2—2 of the inverters 26 and 28.

Figure 10:
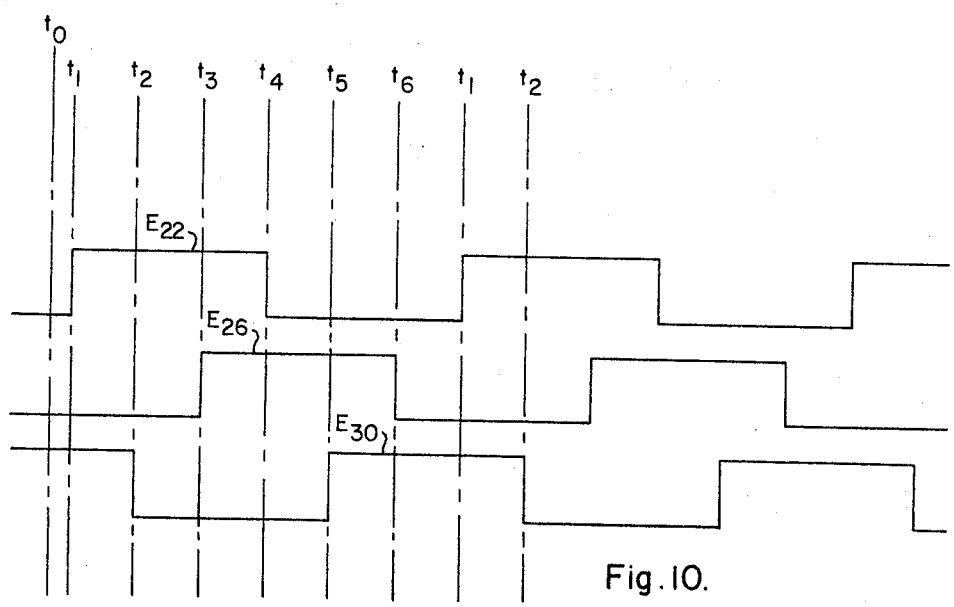
FIG. 10 is a view illustrating the relationship of the output voltage waves of the inverters which are directly driven by the oscillator.
Figure 12:
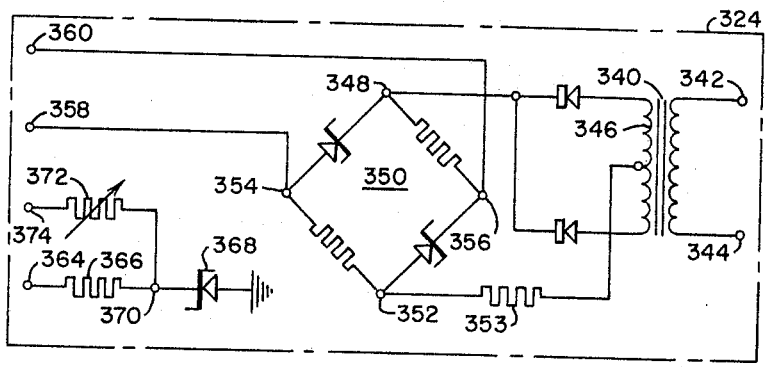
FIG. 12 is a schematic diagram of a pulse width modulator which may be used in FIG. 11.

The apparatus illustrtaed in FIGS. 11 and 12 which produces the voltage vectors as illustrated in FIG. 4 comprises the aforementioned transformers 306, 308, and 310 which are actuated by the inverters 22, 26 and 30. As illustrated in FIG. 10 the output voltages $E_{22}$, $E_{26}$ and $E_{30}$ of the inverters 22, 26 and 30, respectively, are substantially square in shape and phase displaced 120 electrical degrees. The drivers 300, 302, and 304 may be identical to the driver D illustrated in FIG. 7 of the copending application, Serial No. 117,966, filed June 19, 1961 for an inverter and assigned to the same assignee as is this application. The terminals 330, 332, 334, 336 and 338 designate the terminals 108, 194, 196, 202 and 204 of the said copending application. The transformers 306, 308 and 310 correspond to the transformer 37 and transformers 312, 314 and 316 to the transformer T of the said copending application.

The pulse width regulating devices 324, 326 and 328 are identical and the circuit of the device 324 only is illustrated in FIG. 12. The device 324 comprises a transformer 340 having its primary winding connected to alternating current input terminals 342 and 344 which, as illustrated, are connected to the lines L1 and L2. The devices 326 and 328 have their terminals 342 and 344 connected, as illustrated in FIG. 11, to the lines L2–L3 and L3–L1 respectively. The transformer 340 is provided with a secondary winding 346 having its end terminals connected through diodes to one input terminal 348 of an error signal bridge 350 and its center tap connected to the other input terminal 352 through a voltage dropping resistor 353. The bridge 350 is provided with output terminals 354 and 356 which connect with device terminals 358 and 360, respectively.

Resistors are connected between terminals 348–356 and 352–354, respectively, while Zener diodes are connected between terminals 348–254 and 352–356, respectively. When the voltage applied to the bridge input terminals 348 and 352 is below a critical voltage, current will flow between the input terminals 348 and 352 through the resistors to provide current flow in a first direction between output terminals 354 and 356 and through the control windings of the saturating core transformers of the driver with which the pulse width regulatory device is associated. When the voltage applied is above the critical voltage, current will flow through the Zener diodes and in the opposite directions between the output terminals 354 and 356 and the control windings. The magnitude of current will depend upon the magnitude of the voltage applied to the terminals 342 and 344.

In order to cause the drivers to conduct at the proper periods to supply the desired output voltage a second control or resetting current is supplied to second control windings on the saturating core transformers. This current is derived from the direct current potential supply 362 which is connected to input terminal 364. Terminal 364 is connected through a potential dropping resistor 366 and a Zener diode 368 to ground whereby a regulated potential with respect to ground is established at connection 370. A variable resistor 372 is connected between connection 370 and device terminal 374. The resistor 372 calibrates the output voltage of the driver.

The remainder of the construction of details may best be understood by a description of the operation of the network which is as follows: Upon energization of the input terminals 276 and 278, the oscillator 34 begins to oscillate as described above to provide a square wave output potential to the pairs of output terminals 35–36, 37–38 and 39–40. These voltages when combined with the interlocking voltages are such that for each half cycle of the oscillator output voltage solely one of the inverters 22, 26 and 30 is actuated. Under these conditions, each half cycle of the oscillator output voltage represents 60 electrical degrees of the inverter output voltage. At an instant $t_0$ (FIG. 10) before a time $t_1$ the output potential of inverter 30 is positive (device 196 conducting and terminal 5 positive with respect to terminal 6) and the output potential of the inverters 22 and 26 are negative (devices 194 conducting).

Under these conditions the terminal 9 of the inverter 22 will be positive with respect to its companion terminal 10 and the terminal 191 of the inverter 30 will be positive with respect to its companion terminal 7 (FIG. 8) whereby the terminal 3 of inverter 30 will be positive with respect to its companion terminal 4. The current, therefore, fed back through resistor 202 of inverter 30 from the above mentioned windings, will be in the same direction as that supplied by the oscillator to terminals 3 and 4 of the inverter 30 at the time $t_1$ so that no switching will occur.

Also at this time $t_0$, the terminal 9 of the inverter 30 will be held negative with respect to its companion terminal 10 but the terminal 7 of the inverter 26 will be positive with respect to its companion terminal 191 whereby the terminal 4 of the inverter 26 will be positive with respect to its companion terminal 3. The current, therefore, fed back through resistor 202 in inverter 26 from the above mentioned windings will be greater than that supplied by the oscillator to terminals 3 and 4 of the inverter 26 at the time $t_1$ so that no switching will occur.

Again, at the time $t_0$, the terminal 9 of the inverter 26 is being maintained positive with respect to its companion terminal 10 and the terminal 7 of the inverter 22 is positive with respect to its companion terminal 191 whereby the transistor 194 is being maintained conductive by the current caused by the difference in potential between the winding 188 of the inverter 26 and the winding 190 of the inverter 22. Therefore, at the time $t_1$, the voltage supplied by the oscillator output winding 146, causes current to flow from the terminal 3 to terminal 4 of the inverter 22 to render the associated transistors 194 and 196 nonconducting and conducting, respectively.

The result of the reversal of the conductive conditions of the devices of inverter 22 is to reverse the output potential at its terminals 5–6, 7–191, 9–10, and 13–14. The reversal of the potentials at 7–191 furnishes a feed back signal which will maintain the terminal 3 of inverter 22 positive with respect to its companion terminal 4 and the device 196 conductive when the oscillator signal disappears. The reversal of the potentials at 9 and 10 of inverter 22 reduces the magnitude of the bias potential which maintains terminal 3 of the inverter 30 positive with respect to its companion terminal 4.

At the time $t_2$, the voltages of the oscillator windings 146, 148 and 150 will again reverse. Since, as explained above, the feedback drive voltage maintaining the terminal 3 of the inverter 30 positive with respect to its companion terminal 4 is the difference between the voltage of winding 190 of the inverter 30 and 188 of the inverter 22. At time $t_2$, the oscillator drive current will be greater than the feedback current and the device 194 of the inverter 30 will become conductive and device 196 will become non-conductive. The reversal of the conductive conditions of the devices 194 and 196 of inverter 30 will place the winding 188 in voltage opposition with the winding 190 of the inverter 26 whereby at the next reversal of the voltage in the oscillator windings 146, 148 and 150 the devices 194 and 196 of the inverter 26 will reverse their conductive conditions. The reversal of the voltage generated in winding 190 of the inverter 26 will maintain the terminal 3 positive with respect to terminal 4 so that the device 196 will remain conducting after the voltage at the oscillator terminals 37 and 38 disappears.

The inverters 22, 26 and 30 will continue to interact on each other in the general manner described above so that each time the output potential of these oscillator windings 146, 148 and 150 reverses, times $t_3$, $t_4$, $t_5$ and $t_6$, solely one of the inverters will be actuated. The order of actuation follows the same order that the various voltages of a polyphase system reverse.

The inverters 24, 28 and 32 are controlled in trailing relationship to the inverters 22, 26 and 30, respectively, at a time delay determined by the controls 62, 64 and 66. For this purpose, as explained above, the square wave output voltage developed by the inverters 22, 26 and 28 at terminals 13 and 14 are individually applied to the input terminals 11 and 12 of the controls 62, 64 and 66 respectively. At the end of the time period required to saturate the respective saturable reactors 210, the drive current will be transmitted to the respective output terminals 15 and 16 of the controls 62, 64 and 66. These output terminals are individually connected to the input terminals 3 and 4 of the inverters 24, 28 and 32 respectively. The inverters 24, 28 and 32 are thereby driven at exactly the same frequency as the leading inverters 22, 26 and 30 and at a lagging phase angle as determined by the controls 62, 64 and 66.

The windings 188 of the trailing inverters 24, 28 and 32 are not used and, in the interest of simplicity, the terminals 9 and 10 have not even been shown. The terminal 7 of each of these inverters is individually connected to its terminal 4 whereby the windings 190 thereby provide a feedback voltage to maintain the conductive device 194 or 196 conductive and the nonconductive device 196 or 194 blocked until the next reversal of potential applied by the associated control 62, 64 or 66.

It is believed that the operation of the form of the invention illustrated in FIGS. 4, 11 and 12 will be apparent and, therefore, no further description is believed necessary.

While the invention has been illustrated being embodied in a three-phase voltage generating circuit of the static converter type and has particular utility when so assembled, it will be apparent that, in its more generic aspect, the lines L1, L2 and L3 may be energized from any source of alternating voltage in which the frequency of the sources is identical and in which there are at least two sources in each line-to-line voltage and in which the same voltage source appears between two sets of lines. It will further be apparent that if sinusoidal wave shapes were generated by these sources, the controls 62, 64 and 66 could take the more usual form of phase shift control. Similarly as described above such a suitable phase shifting device might comprise a so-called Alexanderson phase shift circuit in which the phase shift is determined by varying the magnitude of resistance of the resistive leg as for example, by varying the conducting characteristics of a transistor serving as the variable resistance.

While only limited specific forms of the invention have been illustrated, many different embodiments of the invention may be made without departing from the spirit and scope thereof and it is intended that all matter contained in the foregoing description or shown in the accompanying drawings shall be interpreted as illustrative and not in a limiting sense.

What is claimed and is desired to be secured by United States Letters Patent is as follows:

1. In a three-phase voltage generating apparatus; three output terminals; three alternating voltage generating devices having output connections and input connections, means connecting said output connections in Y to said output terminals whereby one of said output connections of each of said devices are connected together and the other of said output connections of said devices are individually connected to said output terminals; each said device comprising a first inverter, a second inverter, a control network for determining the phase difference in the alternating voltages generated by its said first and second inverters, and means connecting the output voltages of its said first and second inverters in series circuit to its said output connections; first means responsive to a first voltage appearing between a first and a second of said output terminals; a first of said devices being the one of said devices connected to said first output terminal and a second of said devices being the one of said devices connected to said second output terminal, said first means being connected to said control network of said first device for actuating said control network of said first device to regulate the phase difference between said first and said second inverters of said first device as a function of said first voltage; means responsive to a second voltage appearing between said second output terminal and the third of said output terminals and connected to said control network of said second device for actuating said control network of said second device to regulate the phase difference between said first and said second inverters of said second device as a function of said second voltage; the third of said devices being the one of said devices connected to said third output terminal; and means responsive to a third voltage appearing between said third output terminal and said first output terminal and connected to said control network of said third device for actuating said control network of said third device to regulate the phase difference between said first and said second inverters of said third device as a function of said third voltage.

2. In a three-phase voltage generating apparatus; three output terminals; three alternating voltage generating devices having output connections and input connections, means connecting said output connections in Y to said output terminals whereby one of said output connections of each of said devices are connected together and the other of said output connections of said devices are individually connected to said output terminals; each said device comprising a first inverter, a second inverter, a control network determining the phase difference in the alternating voltages generated by its said first and second inverters, and means connecting the output voltages of its said first and second inverters in series circuit to its said output connections; a source of reference voltage; a first voltage comparator having a first input connected to respond to a first voltage appearing between a first and a second of said output terminals and a second input connected to respond to the reference voltage established by said reference voltage source; said first comparator having a first control voltage of a magnitude which is a function of the combined magnitudes of said reference voltage and said first voltage; a first of said devices being the one of said devices connected to said first output terminal and a second of said devices being the one of said devices connected to said second output terminal, said first comparator being connected to said control network of said first device for actuating said control network of said first device to regulate the phase difference between said first and said second inverters of said first device as a function of said first control voltage; a second voltage comparator having a first input connected to respond to a second voltage appearing between said second output terminal and the third of said output terminals and a second input connected to respond to said reference voltage; said second comparator having a second control voltage of a magnitude which is a function of the combined magnitudes of said reference voltage and said second voltage; said second comparator being connected to said control network of said second device for actuating said control network of said second device to regulate the phase difference between said first and said second inverters of said second device as a function of said second control voltage; the third of said devices being the one of said devices connected to said third output terminal; and a third voltage comparator having a first input connected to respond to a third voltage appearing between said third output terminal and said first output terminal and a second input connected to respond to said reference voltage; said third comparator having a third control voltage of a magnitude which is a function of the combined magnitudes of said reference voltage and said third voltage; said third comparator being connected to said control network of said third device for actuating said control network of said third device to regulate the phase difference between said first and said second inverters of said third device as a function of said third control voltage.

3. In a three-phase voltage generating apparatus; three output terminals; three alternating voltage generating devices having output connections and input connections, means connecting said output connections in Y to said output terminals whereby one of said output connections of each of said devices are connected together and the other of said output connections of said devices are individually connected to said output terminals; each said device comprising a first inverter, a second inverter, a control network having input means connected to said first inverter and actuated by an alternating voltage generated by said first inverter, said control network having output means energized with alternating potential at the same frequency as that applied to its input means, said control network further including determining means for determining the time interval between the occurrence of a predetermined voltage magnitude of the alternating voltage applied to its said input means and the occurrence of a selected voltage magnitude of the alternating voltage appearing at its said output means, means connecting said output means to said second inverter, said second inverter being operable to reverse the polarity of its output voltage as a consequence of the occurrence of said selected voltage magnitude at said output means whereby said determining means regulates the phase difference in the alternating voltages generated by its said first and second inverters, and means connecting the output voltages of its said first and second inverters in series circuit to its said output connections; first means responsive to a first voltage appearing between a first and a second of said output terminals; a first of said devices being the one of said devices connected to said first output terminal and a second of said devices being the one of said devices connected to said second output terminal, said first means being connected to said determining means of said first device for actuating said control network of said first device to regulate the phase difference between said first and said second inverters of said first device as a function of said first voltage; means responsive to a second voltage appearing between said second output terminal and the third of said output terminals and connected to said determining means of said second device for actuating said control network of said second device to regulate the phase difference between said first and said second inverters of said second device as a function of said second voltage; the third of said devices being the one of said devices connected to said third output terminal; and means responsive to a third voltage appearing between said third output terminal and said first output terminal and connected to said determining means of said third device for actuating said control network of said third device to regulate the phase difference between said first and said second inverters of said third device as a function of said third voltage.

4. In a three-phase power system, a plurality of regulatable phase displaced alternating voltage power sources, first and second and third line terminals, first network means including at least a first and a second of said sources connected between said first and said second terminals for establishing a first line voltage therebetween, second network means including at least said second and third of said sources connected between said second and said third terminals for establishing a second line voltage therebetween, third network means including at least said third and said first sources connected between said third and said first terminals for establishing a third line voltage therebetween, regulating means connected to said first and said second and said thrid sources, said regulating means being effective to individually regulate the magnitude of the voltage output of said first and said second and said third sources, said regulating means having a first circuit means connected to respond to the magnitude of a first voltage which exists betwen said first and said second terminals for actuating said regulating means to vary the output voltage of at least one of said first and second sources to maintain the magnitude of said first voltage at a selected value, said regulating means having a second circuit means connected to respond to the magnitude of a second voltage which exists between said second and said third terminals for actuating said regulating means to vary the output voltage of at least one of said second and said third sources to maintain the magnitude of said second voltage at a selected value, said regulating means having a third circuit means connected to respond to the magnitude of a third voltage which exists between said third and said first terminals for actuating said regulating means to vary the output voltage of at least one of said third and said first sources to maintain the magnitude of said third voltage at a selected value.

5. In a three-phase power system, a plurality of regulatable phase displaced alternating voltage power sources, first and second and third line terminals, first network means including at least a first and a second of said sources connected between said first and said second terminals for establishing a first line voltage therebetween, second network means including at least said second and a third of said sources connected between said second and said third terminals for establishing a second line voltage therebetween, third network means including at least said third and said first sources connected between said third and said first terminals for establishing a third line voltage therebetween, regulating means, means connecting said regulating means to said first and second and third sources, said regulating means being operable to individually regulate the magnitude of the voltage output of said first and said second and said third sources, circuit means connected to be energized by said first and said second and said third sources, said just-named circuit means being responsive to the individual magnitudes of said line voltages, means connecting said just-named circuit means to said regulating means for actuating said regulating means whereby said regulating means is actuated to maintain the magnitude of the voltage of said first and said second and said third sources at first and second and third selected values respectively, said values all being of equal magnitude.

6. In a three-phase power system, a plurality of phase displaced alternating voltage power sources, first and second and third line terminals, first network means including at least a first of said sources connected between said first and said second terminals for establishing a first line voltage therebetween, second network means including at least a second of said sources connected between said second and said third terminals for establishing a second line voltage therebetween, third network means including at least a third of said sources connected between said third and said first terminals for establishing a third line voltage therebetween, means responsive to a change in the output voltage of said first source for changing the magnitude of said second line voltage, means responsive to a change in the output voltage of said second source for changing the magnitude of said third line voltage, means responsive to a change in the output voltage of said third source for changing the magnitude of said first line voltage, regulating means individually regulating the magnitude of the voltage output of said first and said second and said third sources, circuit means responsive to the individual magnitude of each said line voltage and connected to said regulating means to individually control the magnitude of the output voltage of said first and said second and said third sources whereby the magnitude of all of said line voltages are maintained equal.

7. In a three-phase power system, a plurality of phase displaced alternating voltage power sources, each said source being effective to supply an output voltage variable in magnitude and phase, first and second and third line terminals, first network means including at least a first of said sources connected between said first and said second terminals for establishing a first line voltage therebetween, second network means including at least a second of said sources connected between said second and said third terminals for establishing a second line voltage therebetween, third network means including at least a third of said sources connected between said third and said first terminals for establishing a third line voltage therebetween, means responsive to a change in at least one of the magnitude and phase of the output voltage of said first source for changing at least one of the magnitude and phase of said second line voltage, means responsive to a change in at least one of the magnitude and phase of the output voltage of said second source for changing at least one of the magnitude and phase of said third line voltage, means responsive to a change in at least one of the magnitude and phase of the output voltage of said third source for changing at least one of the magnitude and phase of said first line voltage, regulating means individually regulating at least one of the magnitude and phase of the voltage output of said first and said second and said third sources, circuit means responsive to the individual magnitude of each said line voltage and connected to said regulating means to individually control at least one of the magnitude and phase of the output voltage of said first and said second and said third sources whereby the magnitude of all of said line voltages are maintained equal.

8. In a three-phase power system, a plurality of phase displaced alternating voltage power sources, each said source including means for adjusting at least one of its output characteristics, first and second and third line terminals, first network means including at least a first and a second of said sources connected between said first and said second terminals for establishing a first line voltage therebetween, second network means including at least said second and a third of said sources connected between said second and said third terminals for establishing a second line voltage therebetween, third network means including at least said third and said first sources connected between said third and said first terminals for establishing a third line voltage therebetween, regulating means connected to said regulating means of said first and second and third sources and effective to individually regulate the magnitude of said regulatable output characteristic of said first and said second and said third sources, circuit means responsive to the individual magnitudes of said line voltages and connected to said regulating means for actuating said regulating means to individually control the magnitude of the said regulatable output characteristic of said first and said second and said third sources whereby all of said line voltages are maintained equal.

9. In a three-phase power system, a plurality of regulatable phase displaced alternating voltage power sources, first and second and third line terminals, first network means including a first group of said sources connected between said first and said second terminals for establishing a first line voltage therebetween, second network means including a second group of said sources connected between said second and said third terminals for establishing a second line voltage therebetween, third network means including a third group of said sources connected between said third and said first terminals for establishing a third line voltage therebetween, at least one of said sources of said first group being common to said first and said second groups, at least one of said sources of said second group being common to said second and said third groups, at least one of said sources of said third group being common to said third and said first groups, voltage magnitude regulating means, means connecting said regulating means to said one source of said first group and to said one source of said second group and to said one source of said third group for individually regulating the magnitude of the voltage outputs thereof, said one sources being selected so that each thereof is a said source separate from the other thereof, circuit means connected to said system and responsive to the individual magnitudes of said line voltages, and means connecting said just-named circuit means to said regulating means for actuating said regulating means, said regulating means when actuated being effective to individually control the magnitude of the voltage of said one voltage sources whereby all of said line voltages are maintained equal.

10. In a three-phase power system, a plurality of phase displaced alternating voltage power sources, each said source including means to regulate an output characteristic thereof, first and second and third line terminals, first network means including a first group of said sources connected between said first and said second terminals for establishing a first line voltage therebetween, second network means including a second group of said sources connected between said second and said third terminals for establishing a second line voltage therebetween, third network means including a third group of said sources connected betwen said third and said first terminals for establishing a third line voltage therebetween, at least one of said sources of said first group being common to said first and said second groups, at least one of said sources of said second group geing common to said second and said third groups, at least one of said sources of said third group being common to said third and said first groups, regulating means connected to said one sources and individually regulating the magnitude of the magnitude of said output characteristic of each of said one sources, circuit means connecting said regulating means to said line terminals, said regulating means being operable to individually regulate the magnitude of the output characteristic of said one voltage sources whereby all of said line voltages are maintained equal.

11. In a three-phase power system, a plurality of phase displaced alternating voltage power sources, first and second and third line terminals, first network means including a first group of said sources connected between said first and said second terminals for establishing a first line voltage therebetween, second network means including a second group of said sources connected between said second and said third terminals for establishing a second line voltage therebetween, third network means including a third group of said sources connected between said third and said first terminals for establishing a third line voltage therebetween, at least one of said sources of said first group being common to said first and said second groups, at least one of said sources of said second group being common to said second and said third groups, at least one of said sources of said third group being common to said third and said first groups, means associated with at least said one source of each of said groups of sources for changing the magnitude of at least one of its phase and voltage, regulating means individually regulating the magnitude of at least said one magnitudes of each of said one sources, circuit means connecting said regulating means to said line terminals, said regulating means being operable to individually control said one magnitudes of said one voltage sources whereby all of said line voltages are maintained equal.

12. In a three-phase power system, a plurality of phase displaced alternating voltage power sources, first and second and third line terminals, first network means including a first and a second of said sources connected between said first and second terminals for establishing a first line voltage therebetween, second network means including said second and a third of said sources connected between said second and said third terminals for establishing a second line voltage therebetween, third network means including said third and said first sources connected between said third and said first terminals for establishing a third line voltage therebetween, each said source including at least a pair of voltage producers, phase controlling means associated with said sources for individually controlling the relative phase of the output voltage of said pairs of producers, regulating means responsive to the magnitude of said line voltages and connected to said phase controlling means for individually controlling said relative phase of said output voltage of said pairs of producers whereby all of said line voltages are maintained at a single desired magnitude.

13. In a polyphase voltage system, an N number of alternating voltage generating devices, each said device including means for varying the magnitude of an output characteristics thereof, an N number of voltage sensitive control devices, means individually connecting said control devices to said varying means of said generating devices, each said control device being effective to modulate the magnitude of said output characteristic of the said generating device to which it is connected, an N number of power output terminals defining an N number of power output phases, means connecting said generating devices in star connection to said output terminals, and circuit means individually connecting each said control device across the said output phase which is energized from the said generating device to which such individual control device is connected, all of said control devices acting to vary the output of the said generating device to which it is connected to establish a predetermined magnitude of phase voltage across all of said N output phases.

14. The combination of claim 13 in which each of said generating devices comprises a pair of sine wave voltage sources and in which the output characteristic is controlled by changing the relative phasing of said sources of the said generating means.

15. The combination of claim 14 in which each of said voltage sources comprises an inverter and in which there is provided sequencing means connected to a first of said inverters for actuating said first inverters in sequence to provide an N number of phase shifted voltages.

References Cited by the Examiner

UNITED STATES PATENTS

| | | | |
|---|---|---|---|
| 2,575,600 | 11/1951 | Smith | 321—27 |
| 2,668,938 | 2/1954 | Henrich | 321—5 |
| 2,912,634 | 11/1957 | Peoples | 321—5 |
| 2,953,735 | 9/1960 | Schmidt | 321—5 |
| 3,052,833 | 9/1962 | Coolidge et al. | 321—5 |
| 3,144,599 | 8/1964 | Brahm | 321—52 X |
| 3,168,692 | 2/1965 | Lilienstein | 321—5 |
| 3,200,321 | 8/1965 | Rosenstein | 321—2 X |

JOHN F. COUCH, *Primary Examiner.*

LLOYD McCOLLUM, *Examiner.*

J. C. SQUILLARO, W. H. BEHA, *Assistant Examiners.*